(12) United States Patent
Haeger et al.

(10) Patent No.: US 6,335,101 B1
(45) Date of Patent: Jan. 1, 2002

(54) COMPOSITE HAVING MORE THAN ONE LAYER

(75) Inventors: Harald Haeger, Marl; Guido Schmitz; Franz-Erich Baumann, both of Duelmen; Giselher Franzmann, Witten; Georg Oenbrink, Duelmen, all of (DE)

(73) Assignee: Degussa-Hüls Aktiengesellschaft, Frankfurt (DE)

( * ) Notice: Subject to any disclaimer, the term of this patent is extended or adjusted under 35 U.S.C. 154(b) by 0 days.

(21) Appl. No.: 09/510,302

(22) Filed: Feb. 22, 2000

(30) Foreign Application Priority Data

Feb. 27, 1999 (DE) ......................................... 199 08 640

(51) Int. Cl.$^7$ .............................................. B32B 27/34
(52) U.S. Cl. ................. 428/475.2; 428/36.91; 428/474.7; 428/476.3; 428/488; 428/480; 428/477.7; 525/425
(58) Field of Search ............................ 428/36.9, 36.91, 428/475.2, 474.4, 474.7, 476.3, 483, 477.7, 480; 525/425

(56) References Cited

U.S. PATENT DOCUMENTS

| 3,200,106 A | | 8/1965 | Dickson et al. |
| 3,686,069 A | | 8/1972 | Winkler et al. |
| 4,217,435 A | | 8/1980 | McConnell et al. |
| 5,378,769 A | * | 1/1995 | Mugge et al. ............... 525/425 |
| 5,641,855 A | | 6/1997 | Scherr et al. |
| 6,090,459 A | * | 7/2000 | Jadamus et al. ........... 428/36.4 |

FOREIGN PATENT DOCUMENTS

DE  42 44 194  6/1994

* cited by examiner

Primary Examiner—James J. Seidleck
Assistant Examiner—Melanie D Bagwell
(74) Attorney, Agent, or Firm—Oblon, Spivak, McClelland, Maier & Neustadt, P.C.

(57) ABSTRACT

A thermoplastic composite having a multiplicity of layers and comprising:

I) a layer of a polyamide molding composition,

II) a layer of a polyester molding composition, and

III) a layer of an adhesion promoter adherent to I and II comprising at least 50% by weight of a blend of:

a) from 20 to 80% by weight of a polyamide, prepared from
    α) at least one diamine having from 6 to 12 carbon atoms, and
    β) an essentially stoichiometrically equivalent amount of at least one dicarboxylic acid comprising at least 5 mol % of a dicarboxylic acid having from 10 to 36 carbon atoms, and b) from 80 to 20% by weight of a polyester, prepared from
    α) a mixture of from 30 to 95 mol % of an aromatic dicarboxylic acid having from 6 to 20 carbon atoms and from 70 to 5 mol % of the same dicarboxylic acid as in the polyamide of the adhesion promoter, having from 10 to 36 carbon atoms, and
    β) at least one diol having from 2 to 12 carbon atoms.

51 Claims, No Drawings

COMPOSITE HAVING MORE THAN ONE LAYER

BACKGROUND OF THE INVENTION

1. Field of the Invention

The invention relates to a composite having at least one polyamide layer and at least one polyester layer, bonded together by an adhesion promoter which adheres to both polyamide and polyester layers.

2. Discussion of the Background

Polyamides and polyesters are by themselves unsuitable for many applications. For example, polyamides are not weather-resistant, since they age when exposed to light and they also absorb atmospheric moisture. This leads to discoloration, impairment of mechanical properties, and also warping. Although polyamides have good mechanical properties, in particular good toughness, they have poor barrier properties. Polar substances in particular can easily migrate through polyamides. This is extremely disadvantageous, for example, for fuel pipes which convey alcohol-containing fuel.

Polyesters are generally highly weather-resistant and have excellent barrier properties with respect to both polar and nonpolar media. However, they are generally susceptible to impact. In particular, the notched impact strength of polyesters is frequently inadequate. Polyesters can therefore not be used by themselves in many instances in which their other properties, such as excellent barrier properties, high heat resistance and good stiffness, would be desirable.

It would therefore be desirable to combine the good mechanical properties of polyamides with the high weather-resistance and excellent barrier properties of polyesters. However, it is generally difficult to bond polyamides and polyesters to form composites which could combine the desirable properties of both materials. It would therefore be desirable to be able to produce a strong bond between polyamides and polyesters. This would allow, for example, moldings made from polyamides to be protected from light and moisture by coating them with a polyester layer. Equally, a molding made from a polyester could be protected from chemical and mechanical effects by coating it with a polyamide layer. This would also provide a way of making fuel piping, which is usually composed of a polyamide (PA), such as PA 6, PA 11 or PA 12, with a layer which can provide a barrier to fuel, in particular to alcohol-containing fuel.

Composites made from polyamides and polyesters are in principle already known. EP-A 0 336 806 describes the coextrusion of PA 12 and polybutylene terephthalate (PBT) to give a two-layer tube. DE-C 38 27 092 describes a tube having more than one layer which has, from inside to outside, layers of polyamide, polyvinyl alcohol, polyamide and polyester. However, a very large majority of polymers, including polyamides and polyesters, are incompatible with one another, meaning that no adhesion is achieved between the laminate layers when polymer laminates are produced. However, in conventional industrial applications, a strong bond between the individual polymer layers is an essential requirement.

A polyester layer and a polyamide layer may be bonded via an adhesion promoter which is composed of a mixture of polyamide and polyester. However, blends of this type, which are produced, for example, by mixing melts in an extruder, are very brittle. Attempts to coextrude such adhesion promoters onto polyamide and polyester give adhesion either to the polyamide or to the polyester, but never to both polymers simultaneously.

EP-A-0 509 211 describes thermoplastic composites having more than one layer, with one layer made from a polyamide molding composition and one layer made from a polyester molding composition, bonded via an adhesion promoter which comprises a mixture of polyamide and polyester. Since the problems discussed above also occur here, in a preferred embodiment at least part of the polyamide fraction in the adhesion promoter and also at least part of the polyester fraction are present in the form of a polyamide-polyester block copolymer. However, the preparation of block copolymers of this type is difficult, and requires the addition of auxiliaries or catalysts which can create problems when the composite is used subsequently in food and drink applications.

In addition, the preparation of such block copolymers requires precise control of the end groups, since they are prepared by linking suitable end groups. One must therefore ensure that the appropriate end groups are present in sufficient concentration. Since commercially available polymers are not adapted to these requirements, special polymer grades have to be prepared and then converted to a block copolymer. The production costs for adhesion promoters of this type are therefore unreasonably high. This applies to a still greater degree to the block copolyesteramides used as adhesion promoters in polyamide/polyester composites having more than one layer, as in the process of EP-A 0 837 088.

SUMMARY OF THE INVENTION

The object of this invention is to provide composites having polyamide and polyester layers joined by an adhesion promoter. The adhesion of the layers in composites of this type should also be retained in the presence of reagents such as fuel or solvents, and also at high temperatures.

DETAILED DESCRIPTION OF THE INVENTION

This object has been achieved by means of a thermoplastic composite having a multiplicity of layers and comprising:

I. a layer of a polyamide molding composition,
II. a layer of a polyester molding composition, and
III. a layer of an adhesion promoter adherent to I and II comprising at least 50% by weight of a blend of:
  a) from 20 to 80% by weight, preferably from 30 to 70% by weight and particularly preferably from 40 to 60% by weight, of a polyamide, prepared from
    α) a diamine having from 6 to 12 carbon atoms, and
    β) an essentially stoichiometrically equivalent amount of dicarboxylic acid, where the dicarboxylic acid comprises at least 5 mol %, preferably at least 15 mol % and particularly preferably at least 25 mol %, of a dicarboxylic acid having from 10 to 36 carbon atoms, and b) from 80 to 20% by weight, preferably from 70 to 30% by weight and particularly preferably from 60 to 40% by weight, of a polyester, prepared from
    α) a mixture of from 30 to 95 mol %, preferably from 50 to 93 mol % and particularly preferably from 70 to 90 mol %, of an aromatic dicarboxylic acid having from 6 to 20 carbon atoms and from 70 to 5 mol %, preferably from 50 to 7 mol % and particularly preferably from 30 to 10 mol %, of the same dicarboxylic acid as in the polyamide of the adhesion promoter, having from 10 to 36 carbon atoms, and
    β) a diol having from 2 to 12 carbon atoms.

The blend present in the adhesion promoter is composed of components partially compatible with one another, where either the polyamide or the polyester forms a continuous phase with the other component dispersed therein, or there is an interpenetrating network in which both phases are continuous. The partial compatibility is discernible on the one hand from scanning electron micrographs and on the other hand from the good mechanical properties of the blend. Unlike physical mixtures of conventional polyamides and polyesters, the novel adhesion promoter has very good adhesion both to polyamide molding compositions and to polyester molding compositions. This very good adhesion is achieved irrespective of whether the polyamide or the polyester is the continuous phase in the adhesion promoter.

The individual components of the composite are described in more detail below.

The polyamides of layer I are mainly aliphatic homo- and copolycondensates, such as PA 46, PA 66, PA 612, PA 810, PA 1010, PA 1012, PA 1212, PA 6, PA 7, PA 8, PA 9, PA 10, PA 11 and PA 12. (The terminology for the polyamides corresponds to an international standard in which the first figure(s) give(s) the carbon atom number of the starting diamine and the second number(s) give(s) the carbon atom number of the dicarboxylic acid. If only one figure is given this means that the starting material was an $\alpha,\omega$-aminocarboxylic acid and/or the lactam derived therefrom. Reference may be made for further information to H. Domininghaus, Die Kunststoffe und ihre Eigenschaften [Plastics and their Properties], pages 272 ff., VDI-Verlag, 1976).

If copolyamides are used, these may, for example, comprise adipic acid, sebacic acid, suberic acid, isophthalic acid, terephthalic acid, naphthalene-2,6-dicarboxylic acid, etc. as coacid and, respectively, bis(4-aminocyclohexyl)methane, trimethylhexamethylenediamine, hexamethylenediamine or the like as codiamine. Lactams, such as caprolactam and laurolactam, and, respectively, aminocarboxylic acids, such as $\omega$-aminoundecanoic acid may also be incorporated as cocomponents.

The preparation of these polyamides is known (e.g. D. B. Jacobs, J. Zimmermann, Polymerization Processes, pp. 424–467, Interscience Publishers, New York, 1977; DE-B 21 52 194).

Other suitable polyamides are mixed aliphatic/aromatic polycondensates, as described, for example, in U.S. Pat. Nos. 2,071,250, 2,071,251, 2,130,523, 2,130,948, 2,241,322, 2,312,966, 2,512,606 and 3,393,210, and also in Kirk-Othmer, Encyclopedia of Chemical Technology, 3rd edn., Vol. 18, pages 328 et seq. and 435 et seq., Wiley & Sons, 1982. Other suitable polyamides are poly(etheresteramides) and, respectively, poly(etheramides). Products of this type are described, for example in DE-A 25 23 991, 27 12 987 and 30 06 961.

The polyamide molding composition of layer I may comprise either one of these polyamides or more than one as a mixture. Up to 40% by weight of other thermoplastics may also be present as long as they do not impair bonding performance. In particular impact-modifying rubbers, such as ethylene-propylene copolymers or ethylene-propylene-diene copolymers (EP-A-0 295 076), polypentenylene, polyoctenylene, copolymers of random or block-type construction made from alkenylaromatic compounds with aliphatic olefins or dienes (EP-A-0 261 748), or core-shell rubbers with a core of tough and resilient material made from (meth)acrylate rubber, butadiene rubber or styrene-butadiene rubber with glass transition temperatures $T_g < -10°$ C., in which the core may have been crosslinked and the shell may be composed of styrene and/or of methyl methacrylate and/or of other unsaturated monomers (DE-A 21 44 528, 37 28 685) may be used.

The polyamide molding composition of layer I may contain the auxiliaries and additives usual for polyamides, such as flame retardants, stabilizers, plasticizers, processing aids, fillers, in particular to improve electrical conductivity, reinforcing fibers, pigments or the like. The amounts of the agents mentioned should be metered in such a way as not seriously to impair the desired properties.

Possible polyesters of layer II are thermoplastic polyesters of linear structure. These are prepared by the polycondensation of diols with dicarboxylic acids and/or polyester-forming derivatives of dicarboxylic acids, such as dimethyl esters. Suitable diols have the formula HO—R—OH, where R is a bivalent, branched or unbranched, aliphatic and/or cycloaliphatic radical having from 2 to 12 carbon atoms, preferably from 2 to 8 carbon atoms. Suitable dicarboxylic acids have the formula HOOC—R'—COOH, where R' is a bivalent aromatic radical having from 6 to 20 carbon atoms, preferably from 6 to 12 carbon atoms.

Examples of diols are ethylene glycol, trimethylene glycol, tetramethylene glycol, hexamethylene glycol, neopentyl glycol and cyclohexanedimethanol. The diols may be used alone or as a diol mixture.

Up to 25 mol % of the diol mentioned may have been replaced by a polyalkylene glycol of the following general formula:

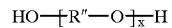

where R" is a bivalent radical having from 2 to 4 carbon atoms and x may be from 2 to 50.

Examples of aromatic dicarboxylic acids are terephthalic acid, isophthalic acid, naphthalene-1,4-, -1,5-, -2,6- and -2,7-dicarboxylic acids, diphenic acid and diphenyl ether 4,4'-dicarboxylic acid. Up to 30 mol % of these dicarboxylic acids may have been replaced by aliphatic or cycloaliphatic dicarboxylic acids, such as succinic acid, adipic acid, sebacic acid, dodecanedioic acid or cyclohexane-1,4-dicarboxylic acid.

Examples of suitable polyesters are polyethylene terephthalate, polypropylene terephthalate, polybutylene terephthalate, polyethylene 2,6-naphthalate, polypropylene 2,6-naphthalate and polybutylene 2,6-naphthalate.

The preparation of these polyesters is known (DE-A 24 07 155, 24 07 156; Ullmanns Encyclopädie der technischen Chemie [Ullmann's Encyclopedia of Industrial Chemistry], $4^{th}$ edn., Vol. 19, pages 65 et seq., Verlag Chemie, Weinheim, 1980).

The polyester molding composition of layer II may comprise either one of these polyesters or more than one in a mixture. Up to 40% by weight of other thermoplastics may moreover be present as long as they do not impair bonding performance, in particular impact-modifying rubbers, as given above for the polyamide. The polyester molding composition may also comprise the auxiliaries and additives usual for polyesters, for example flame retardants, stabilizers, processing aids, fillers, in particular to improve electrical conductivity, reinforcing fibers, pigments or the like. The amount of the agents mentioned is to be metered in such a way as not seriously to impair the properties desired.

The molding composition of layer I generally has a continuous polyamide phase and the molding composition of layer II generally has a continuous polyester phase.

The adhesion promoter comprises a polyamide which has good compatibility with the polyamide of layer I and therefore permits good adhesion. Together with this it comprises a polyester which has good compatibility with the polyester of layer II. Surprisingly, the polyamide and polyester of the adhesion promoter are also at least to some extent compatible with one another, due to the monomer which they have in common.

The polyamide of the adhesion promoter generally has good compatibility with the polyamide of layer I if both polyamides have at least one monomer in common, i.e. the dicarboxylic acid or the diamine. However, very often it is even sufficient if one monomer in each corresponds to the other with an identical carbon atom number or with identical length. Suitable polyamide combinations are either known to the person skilled in the art or can readily be determined by simple routine experiments, e.g. using pressed plaques.

The polyamide of the adhesion promoter comprises a monomer derived from a diamine having from 6 to 12 carbon atoms. Examples of suitable diamines are hexamethylenediamine, trimethylhexamethylenediamine, octamethylenediamine, nonamethylenediamine, decamethylenediamine and dodecamethylenediamine. From among the relevant dicarboxylic acid monomers, at least 5 mol % derives from a dicarboxylic acid having from 10 to 36 carbon atoms, for example 1,10-decanedioic acid, 1,11-undecanedioic acid, 1,12-dodecanedioic acid, dimeric fatty acid or naphthalene-2,6-dicarboxylic acid. The remaining dicarboxylic acid monomers, if any are present, derive from any other carboxylic acid, for example adipic acid, suberic acid, terephthalic acid or isophthalic acid. In individual cases the polyamide may moreover also contain, as a comonomer, subordinate amounts of a lactam, such as caprolactam or laurolactam, and/or of an aminocarboxylic acid, such as ω-aminoundecanoic acid. However, care has to be taken that this does not result in excess lowering of the melting point, and neither must the compatibility of the individual components be impaired.

The amounts of diamine(s) and dicarboxylic acid(s) used to prepare this polyamide are essentially stoichiometrically equivalent. By stoichiometrically equivalent is meant that the amounts in which the diamine(s) and dicarboxylic acid (s) are used are substantially equimolar to the extent that they give a high-molecular-weight polyamide, and the blend prepared therefrom can therefore be coextruded. This includes polymers made using a small excess of diamine or dicarboxylic acid to control the molecular weight of the polymer formed. The amount of excess diamine or dicarboxylic acid used is typically no more than 0.5 mole %.

Alternatively, it is also possible, if desired, to add a monofunctional regulator, such as stearic acid, benzoic acid or stearylamine, in the polycondensation. If monofunctional regulators are employed, the amount of such regulators is typically no more than 0.5 mole %, relative to the total moles of monomers employed.

The polyester of the adhesion promoter is prepared by known methods from diol(s) and dicarboxylic acid(s) or ester-forming derivatives thereof. The aromatic dicarboxylic acid used has from 6 to 20 carbon atoms, and the diol(s) used may be the same compound(s) as described for the polyester of layer II. The polyester of the adhesion promoter generally has good compatibility with the polyester of layer II if both polyesters have at least one monomer in common, i.e. the dicarboxylic acid or the diol, or if the corresponding monomers are at least similar. Suitable polyester combinations are either known, or may readily be determined by simple pressed-sheet experiments.

Besides the polyamide and the polyester, the adhesion promoter may also comprise an impact-modifying rubber and/or auxiliaries and/or additives, as described in greater detail above, as possible constituents of the layers I and II.

In one embodiment the novel composite having more than one layer is a pipe, a filling port or a container, in particular for conveying or storing liquids or gases. A pipe of this type may be made in straight or corrugated form, or corrugated only in some sections. Corrugated pipes are well known (e.g. U.S. Pat. No. 5,460,771). Important applications are fuel piping, filling ports for tanks, vapor lines (i.e. piping which conveys fuel vapors, e.g. ventilation piping), gas station line, coolant piping, air-conditioner piping and fuel containers.

The novel composite having more than one layer may also be a sheet composite, for example a film, such as a packaging film for food or drink, or a composite article with an outer layer for improving UV resistance, or an extruded panel having more than one layer.

When the novel composite having more than one layer is used for conveying or storing combustible liquids, gases or dusts, e.g. fuel or fuel vapors, it is advisable for one layer of the composite, or an additional inner layer, to be rendered electrically conductive. This may be done by compounding with an electrically conductive additive by any known method. Examples of conductive additives which may be used are conductive carbon black, metal flakes, metal powders, metallized glass beads, metallized glass fibers, metal fibers (made from stainless steel, for example), metallized whiskers, carbon fibers (unmetallized or metallized), intrinsically conductive polymers or graphite fibrils. It is also possible to use mixtures of different conductive additives. It is preferable for the electrically conductive layer to be in direct contact with the medium to be conveyed or stored and to have a surface resistivity of not more than $10^9$ Ωcm.

If the novel composite having more than one layer is formed into a pipe, this may also have an additional surrounding layer of elastomer. Suitable materials for the surrounding layer are either crosslinking rubber compositions or else thermoplastic elastomers. The surrounding layer may be applied to the pipe either with or without the use of an additional adhesion promoter, for example by extrusion via a crosshead die or by inserting the finished extruded pipe having more than one layer into a previously produced pipe of elastomer.

The composite having more than one layer may be produced in one or more steps, for example by a one-step process of multicomponent injection molding, coextrusion or coextrusion blow molding, or by a process with more than one step, as is described, for example, in U.S. Pat. No 5,554,425.

In the simplest embodiment the composite having more than one layer may be composed of layer I, the adhesion promoter and layer II. However, the use of additional layers can also give, for example, the following layer configurations:

rubber/layer I/adhesion promoter/layer II;
layer I/adhesion promoter/layer II/electrically conductive layer II;
layer I/adhesion promoter/layer II/adhesion promoter/layer I;
layer I/adhesion promoter/layer II/adhesion promoter/ electrically conductive layer I;
rubber/layer I/adhesion promoter/layer II/adhesion promoter/layer I/conductive layer I;
layer II/adhesion promoter/layer I/electrically conductive layer I.

These multilayer composite structures may be characterized as having an inner and outer surface. When used to store or transport materials, for example fluids and solids, in the form of a container or pipe, the layer of the composite on the inner surface, in contact with the stored or transported material, is termed the innermost layer, while the layer of the composite which is on the outer surface of the container or pipe is termed the outermost layer. For example, when the multilayer composite of this invention is used as a pipe, the innermost layer is the layer contacting the interior volume of the pipe, and the outermost layer is the layer on the exterior surface of the pipe.

Having generally described this invention, a further understanding can be obtained by reference to certain specific examples which are provided herein for purposes of illustration only, and are not intended to be limiting unless otherwise specified.

EXAMPLES

The following components were used in the experiments:

Polyamide of layer I:

PA 1: VESTAMID L 2140, a PA 12 with a relative viscosity $\eta_{rel}$ of 2.1

PA 2: VESTAMID L 2124, a plasticizer-containing PA 12 with a relative viscosity $\eta_{rel}$ of 2.1

Polyamide of the adhesion promoter:

PA 3: VESTAMID D 16, a PA 612 (monomer basis hexamethylenediamine and 1,12-dodecanedioic acid) from Degussa-Hüls AG, D-45764 Marl, with a relative viscosity $\eta_{rel}$ of 1.6.

PA 4: VESTAMID D 22, a PA 612 from Degussa-Hüls AG with $\eta_{rel}$=2.1

Polyester of layer II:

PES 1: VESTODUR 1000, a homopolybutylene terephthalate from Degussa-Hüls AG with a solution viscosity J, measured in phenol/o-dichlorobenzene (1:1) of 107 cm$^3$/g PES 2: VESTODUR 2000, a homopolybutylene terephthalate from Degussa-Hüls AG with a solution viscosity J of 145 cm$^3$/g Polyester of the adhesion promoter:

PES 3: Copolyester made from terephthalic acid (85 mol %) and 1,12-dodecanedioic acid (15 mol %), and also 1,4-butanediol, solution viscosity 180 cm$^3$/g PES 4: Copolyester made from terephthalic acid (85 mol %) and 1,12-dodecanedioic acid (15 mol %), and also 1,4-butanediol, solution viscosity J 120 cm$^3$/g Adhesion promoter (in each case 1:1 parts by volume to improve comparability):

AP 1 (not according to the invention):

The melts of 43.8 parts by weight of PA 1 and 56.2 parts by weight of PES 1 were mixed, extruded and pelletized on a Berstorff ZE 25 33D twin-screw kneader at 280° C. and 200 rpm with a throughput of 10 kg/hour.

Scanning electron micrographs show that the blend has a continuous PBT phase and a disperse PA 12 phase.

AP 2 (not according to the invention):

As for AP 1, except that the melts were mixed at 270° C. Here, too, the blend has a continuous PBT phase and a disperse PA 12 phase.

AP 3 (according to the invention):

The melts of 9.18 kg of PA 3 and 10.81 kg of PES 3 were mixed, extruded and pelletized on a Berstorff ZE 25 33D twin-screw kneader at 290° C. and 250 rpm with a throughput of 10 kg/hour.

Scanning electron micrographs show that the blend has a continuous polyamide phase and a disperse polyester phase.

AP 4 (according to the invention):

As for AP 3, except that PA 4 and PES 4 were used. Scanning electron micrographs show that the blend has a continuous polyester phase and a disperse polyamide phase.

AP 5 (according to the invention):

As in AP 3, except that PA 4 was used instead of PA 3. Here, too, the blend has a continuous polyester phase and a disperse polyamide phase.

To produce the composites having more than one layer, use was made of a tape coextrusion die with an exit width of 30 mm, and the different layers were brought together in the die shortly before discharge of the melt from the die. The die here was fed from three Storck 25 extruders. After exit from the die, the three-layer composite was laid onto a chill roll and drawn off (chill-roll process).

The results are given in the table below, with adhesion classed as follows:

0 no adhesion 1 slight adhesion 2 some adhesion, little effort required for separation 3 good adhesion, substantial effort and in some cases tools required for separation 4 separation impossible even after 30 minutes in Lipoxol at 160° C.

| | | | | Adhesion | |
| --- | --- | --- | --- | --- | --- |
| Example | Layer I | Adhesion Promoter | Layer II | Interface Layer I/ Adhesion Promoter | Interface Layer II/ Adhesion Promoter |
| 1*) | PA1 | AP1 | PES1 | 0 | 4 |
| 2*) | PA2 | AP2 | PES2 | 0 | 4 |
| 3 | PA2 | AP3 | PES2 | 4 | 4 |
| 4 | PA2 | AP4 | PES2 | 4 | 4 |
| 5 | PA2 | AP5 | PES2 | 4 | 4 |
| 6 | PA1 | AP5 | PES1 | 4 | 4 |

*not according to the invention

The priority document of the present application, German patent application 19908640.0 filed Feb. 27, 1999, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed is:

1. A thermoplastic composite having a multiplicity of layers and comprising:

I) a layer of a polyamide molding composition,

II) a layer of a polyester molding composition, and

III) a layer of an adhesion promoter adherent to I and II consisting of a blend of:

a) from 20 to 80% by weight of a polyamide, prepared from

α) at least one diamine having from 6 to 12 carbon atoms, and

β) an essentially stoichiometrically equivalent amount of at least one dicarboxylic acid comprising at least 5 mol % of a dicarboxylic acid having from 10 to 36 carbon atoms, and b) from 80 to 20% by weight of a polyester, prepared from α) a mixture of from 30 to 95 mol % of an aromatic dicarboxylic acid having from 6 to 20 carbon atoms and from 70 to 5 mol % of the same dicarboxylic acid as in the polyamide of the adhesion promoter, having from 10 to 36 carbon atoms, and β) at least one diol having from 2 to 12 carbon atoms.

2. The composite of claim 1, which comprises more than one layer I and/or more than one layer II.

3. The composite of claim 1, wherein a rubber layer is adherent to the outermost layer of said composite.

4. The composite of claim 1, wherein one of the layers of said composite has been rendered electrically conductive.

5. The composite of claim 1, wherein at least one of said layers comprises at least one conductive additive selected from the group consisting of conductive carbon black, metal flakes, metal powders, metallized glass beads, metallized glass fibers, metal fibers, stainless steel fibers, metallized whiskers, metallized carbon fibers, carbon fibers, intrinsically conductive polymers, graphite fibrils, and mixtures thereof.

6. The composite of claim 1, wherein an electrically conductive layer is adherent to the innermost layer of said composite.

7. The composite of claim 2, wherein an electrically conductive layer is adherent to the innermost layer of said composite.

8. The composite of claim 3, wherein an electrically conductive layer is adherent to the innermost layer of said composite.

9. The composite of claim 1, in the form of a pipe.

10. The composite of claim 9, which has been partially or wholly corrugated.

11. The composite of claim 1, in the form of a hollow article.

12. The composite of claim 2, in the form of a hollow article.

13. The composite of claim 3, in the form of a hollow article.

14. The composite of claim 4, in the form of a hollow article.

15. The composite of claim 5, in the form of a hollow article.

16. The composite of claim 1, wherein said polyamide component of said adhesion promoter forms a continuous phase with said polyester component of said adhesion promoter dispersed therein.

17. The composite of claim 1, wherein said polyester component of said adhesion promoter forms a continuous phase with said polyamide component of said adhesion promoter dispersed therein.

18. A thermoplastic composite having a multiplicity of layers and comprising:

I) a layer of a polyamide molding composition,

II) a layer of a polyester molding composition, and

III) a layer of an adhesion promoter adherent to I and II comprising at least 50% by weight of a blend of:

a) from 20 to 80% by weight of a polyamide, prepared from

α) at least one diamine having from 6 to 12 carbon atoms, and

β) an essentially stoichiometrically equivalent amount of at least one dicarboxylic acid comprising at least 5 mol % of a dicarboxylic acid having from 10 to 36 carbon atoms, and b) from 80 to 20% by weight of a polyester, prepared from α) a mixture of from 30 to 95 mol % of an aromatic dicarboxylic acid having from 6 to 20 carbon atoms and from 70 to 5 mol % of the same dicarboxylic acid as in the polyamide of the adhesion promoter, having from 10 to 36 carbon atoms, and β) at least one diol having from 2 to 12 carbon atoms;

wherein said polyester component and said polyamide component of said adhesion promoter form an interpenetrating network.

19. The composite of claim 18, which comprises more than one layer I and/or more than one layer II.

20. The composite of claim 18, wherein a rubber layer is adherent to the outermost layer of said composite.

21. The composite of claim 18, wherein one of the layers of said composite has been rendered electrically conductive.

22. The composite of claim 18, wherein at least one of said layers comprises at least one conductive additive selected from the group consisting of conductive carbon black, metal flakes, metal powders, metallized glass beads, metallized glass fibers, metal fibers, stainless steel fibers, metallized whiskers, metallized carbon fibers, carbon fibers, intrinsically conductive polymers, graphite fibrils, and mixtures thereof.

23. The composite of claim 18, wherein an electrically conductive layer is adherent to the innermost layer of said composite.

24. The composite of claim 19, wherein an electrically conductive layer is adherent to the innermost layer of said composite.

25. The composite of claim 20, wherein an electrically conductive layer is adherent to the innermost layer of said composite.

26. The composite of claim 18, in the form of a pipe.

27. The composite of claim 26, which has been partially or wholly corrugated.

28. The composite of claim 18, in the form of a hollow article.

29. The composite of claim 19, in the form of a hollow article.

30. The composite of claim 20, in the form of a hollow article.

31. The composite of claim 21, in the form of a hollow article.

32. The composite of claim 22, in the form of a hollow article.

33. The composite of claim 18, wherein said polyamide component of said adhesion promoter forms a continuous phase with said polyester component of said adhesion promoter dispersed therein.

34. The composite of claim 18, wherein said polyester component of said adhesion promoter forms a continuous phase with said polyamide component of said adhesion promoter dispersed therein.

35. A thermoplastic composite having a multiplicity of layers and comprising:

I) a layer of a polyamide molding composition,

II) a layer of a polyester molding composition, and

III) a layer of an adhesion promoter adherent to I and II comprising at least 50% by weight of a blend of:

a) from 20 to 80% by weight of a polyamide, prepared from

α) at least one diamine having from 6 to 12 carbon atoms, and

β) an essentially stoichiometrically equivalent amount of at least one dicarboxylic acid comprising at least 5 mol % of a dicarboxylic acid having from 10 to 36 carbon atoms, and b) from 80 to 20 % by weight of a polyester, prepared from α) a mixture of from 30 to 95 % of an aromatic dicarboxylic acid having from 6 to 20 carbon atoms and from 70 to 5 mol % of the same dicarboxylic acid as in the polyamide of the adhesion promoter, having from 10 to 36 carbon atoms, and β) at least one diol having from 2 to 12 carbon atoms;

wherein said polyamide component of said adhesion promoter is polymerized from at least one monomer selected from the group consisting of caprolactam, laurolactam, ω-aminoundecane, and mixtures thereof.

36. The composite of claim 35, which comprises more than one layer I and/or more than one layer II.

37. The composite of claim 35, wherein a rubber layer is adherent to the outermost layer of said composite.

38. The composite of claim 35, wherein one of the layers of said composite has been rendered electrically conductive.

39. The composite of claim 35, wherein at least one of said layers comprises at least one conductive additive selected from the group consisting of conductive carbon black, metal flakes, metal powders, metallized glass beads, metallized glass fibers, metal fibers, stainless steel fibers, metallized whiskers, metallized carbon fibers, carbon fibers, intrinsically conductive polymers, graphite fibrils, and mixtures thereof.

40. The composite of claim 35, wherein an electrically conductive layer is adherent to the innermost layer of said composite.

41. The composite of claim 36, wherein an electrically conductive layer is adherent to the innermost layer of said composite.

42. The composite of claims 37, wherein an electrically conductive layer is adherent to the innermost layer of said composite.

43. The composite of claim 35, in the form of a pipe.

44. The composite of claim 43, which has been partially or wholly corrugated.

45. The composite of claim 35, in the form of a hollow article.

46. The composite of claim 36, in the form of a hollow article.

47. The composite of claim 37, in the form of a hollow article.

48. The composite of claim 38, in the form of a hollow article.

49. The composite of claim 39, in the form of a hollow article.

50. The composite of claims 35, wherein said polyamide component of said adhesion promoter forms a continuous phase with said polyester component of said adhesion promoter dispersed therein.

51. The composite of claim 35, wherein said polyester component of said adhesion promoter forms a continuous phase with said polyamide component of said adhesion-promoter dispersed therein.

* * * * *